June 21, 1960 R. D. KISTLER 2,942,124

SUMMING NETWORK

Filed Oct. 11, 1957 2 Sheets-Sheet 1

INVENTOR.
ROLAND D. KISTLER,
BY Perry E. Turner
AGENT.

June 21, 1960 R. D. KISTLER 2,942,124

SUMMING NETWORK

Filed Oct. 11, 1957 2 Sheets-Sheet 2

INVENTOR.
ROLAND D. KISTLER,
BY Berry E. Turner
AGENT.

United States Patent Office 2,942,124

Patented June 21, 1960

2,942,124

SUMMING NETWORK

Roland D. Kistler, Grand Rapids, Mich., assignor to Lear, Incorporated

Filed Oct. 11, 1957, Ser. No. 689,576

1 Claim. (Cl. 307—88.5)

Figure 1:
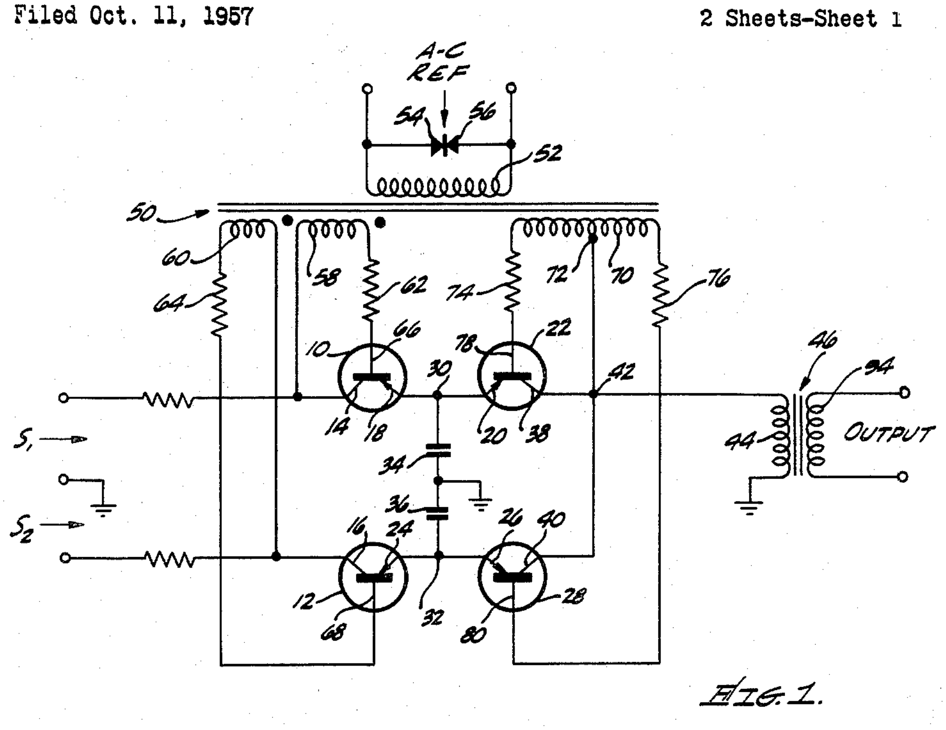

This invention relates to electronic networks for mixing or summing cyclical signals, and more particularly to an improved summing network in which attentuation of the signals is elminated.

In presently known summing networks, separate signals are summed by passing them to a predetermined point through respective impedance paths. Often the separate signals are strong, but the impedances cause them to be greatly attenuated. Accordingly, amplifiers must be used to insure that the summed signals will be of usable magnitude.

It is an object of this invention to provide an improved summing network in which attenuation of the signals being summed is avoided, and wherein amplifiers heretofore required to increase the gain of attenuated signals are eliminated.

It is another object of this invention to provide an electronic network employing a switching scheme to permit separate signals to be summed without attenuation.

Another object of this invention is to provide an electronic network having separate signal inputs and a common output, which utilizes a switching scheme to effect mixing of the signals in the common output without attenuation, and wherein the signals present at one input cannot effect signals present at another input either directly or by feedback from the common output.

The above and other objects and advantages of this invention will become apparent from the following description, taken in conjunction with the accompanying drawing, in which a preferred embodiment is illustrated by way of example. The scope of the invention is pointed out in the appended claim.

Figure 3:
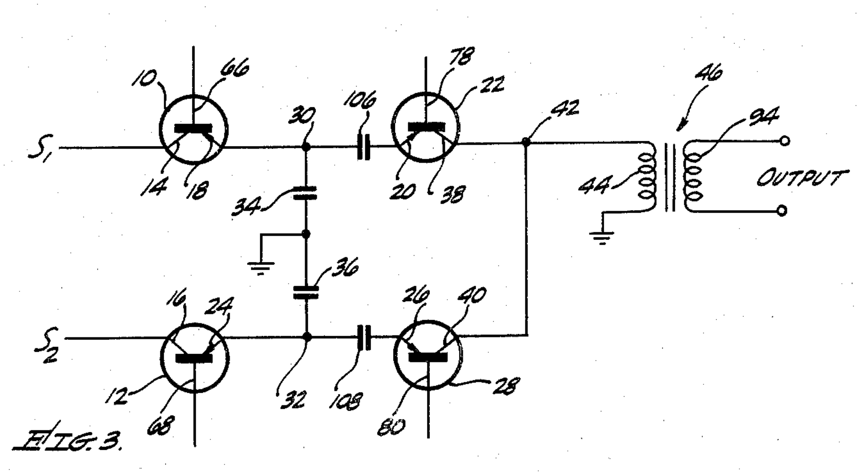

In the drawing:

Fig. 1 is a schematic diagram of an improved summing network in accordance with this invention, Figs. 2*a*–2*e* illustrate waveforms to aid in explaining the operation of the circuit of Fig. 1, Fig. 3 is a schematic diagram illustrating a modification of a portion of the circuit of Fig. 1 for obtaining and summing the first time derivatives of separate signals, also in accordance with this invention, and Figs. 4*a*–4*d* illustrate waveforms to aid in explaining the operation of the circuit modified in Fig. 3.

Referring to Fig. 1, a pair of transistors 10, 12 are adapted to have respective signals $S_1$ and $S_2$ applied between their collector electrodes 14, 16 and a point of reference or ground potential, as indicated. The emitter electrode 18 of transistor 10 is directly connected to the emitter electrode 20 of another transistor 22, and the emitter electrode 24 of transistor 12 is directly connected to the emitter electrode 26 of a fourth transistor 28. The junction 30 of emitters 18, 20 and the junction 32 of emitters 24, 26 are coupled through respective capacitors 34 and 36 to ground. The collector electrodes 38, 40 of transistors 22, 28 are directly connected, and their junction 42 is connected to the ungrounded terminal of the primary winding 44 of an output transformer 46.

To effect operation of the transistor in accordance with this invention, all the transistors are rendered alternately conducting. Furthermore, transistors 10, 12 are alternately conducting with respect to each other; the same is true of transistors 10, 22 and transistors 12, 28. Thus, transistors 10, 28 and transistors 12, 22 are simultaneously conducting. The effect of the operation of the transistors in this manner for summing purposes will be described hereafter with reference to Figs. 2*a*–2*e*.

The means to effect operation of the transistors in the manner above described includes a transformer 50 wherein the primary winding 52 thereof is arranged, as by means of shunting double anode Zener diode 54, to effect a square wave output in response to an A.-C. reference voltage. Respective secondary windings 58, 60 and current limiting resistors 62, 64 are connected in series between collector electrodes 14, 16 and the associated base electrodes 66, 68 of transistors 10, 12. For transistors 22, 28, a secondary winding 70 is provided with a center tap 72 connected to junction 42, and its end terminals are connected through respective current limiting resistors 74, 76 to the base electrodes 78, 80 of transistors 22, 28. With secondary winding 70 thus arranged, it will be apparent that transistors 22, 28 will be alternately conducting. Further, secondary windings 58, 60 are properly poled to insure that transistors 10, 12 conduct alternately with respect to each other and also with respect to the transistors 22, 28.

Figures 2A, 2B, 2C, 2D, 2E:
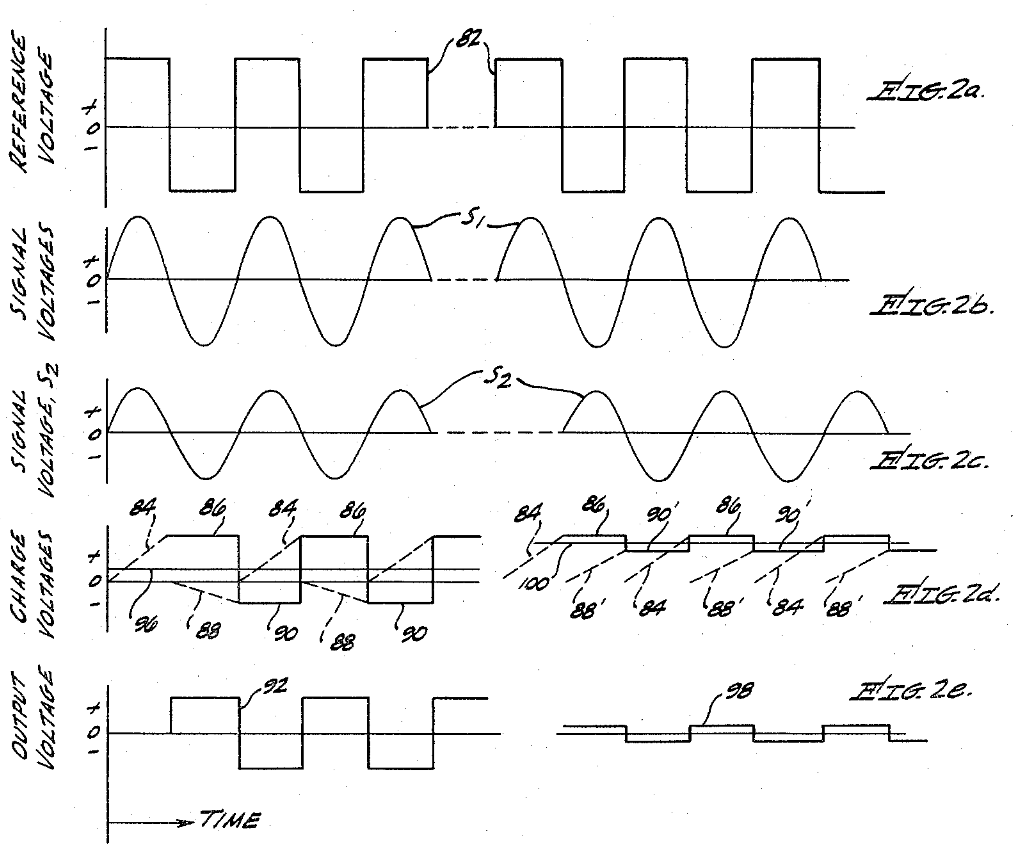
Figures 4A, 4B, 4C:
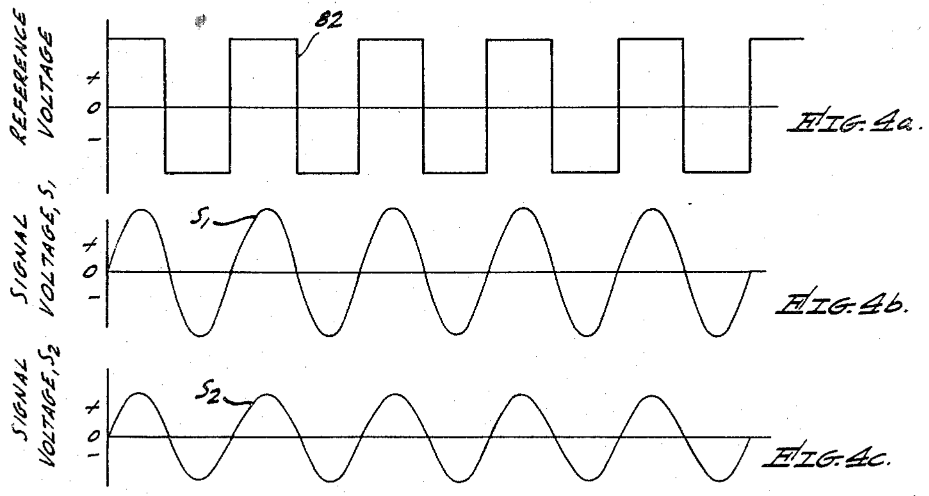
Figure 4D:
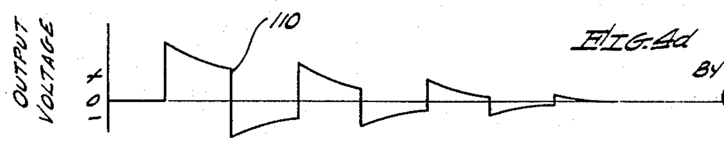

Fig. 2*a* illustrates a square-wave reference voltage 82 as above described, Fig. 2*b* illustrates signal voltages $S_1$, in phase with the reference voltage, applied to a collector electrode 14 of transistor 10, and Fig. 2*c* illustrates signal voltages $S_2$ applied to the collector electrode 16 of transistor 12. Two sets of reference voltages 82 and signals $S_1$ and $S_2$ are illustrated, the signal voltage $S_2$ in one instance being in phase, and in another instance to be 180° out of phase, with signal $S_1$.

Referring to Fig. 2*d*, for the situation where $S_2$ and $S_1$ are in phase, assume that transistors 10, 28 conduct during the positive half cycles of reference voltage 82, and that transistors 12, 22 conduct during the negative half cycles of the reference voltage. During conduction of transistor 10, capacitor 34 receives a net charge which represents the average value of the concurrent positive half cycle, such charge being built-up during each positive half cycle, as along lines generally indicated at 84, to a charge 86 corresponding to such average value. During the succeeding negative half cycle, this charge on capacitor 34 appears at junction 42.

During each negative half cycle, capacitor 36 represents a net charge, as along lines generally indicated at 88, which reaches a charge voltage 90 corresponding to the average value of such negative half cycle. The charge on capacitor 36 during conduction of transistor 28 during the succeeding positive half cycle appears at junction 42.

Signal $S_1$ is illustrated as greater in magnitude than signal $S_2$. As shown in Fig. 2*d*, the charge voltages 86 and 90 appear at junction 42 as of opposite polarities, with the charge voltage 86 being greater than charge voltage 90 by an amount representing the difference in the magnitudes of $S_1$ and $S_2$. The effect of output transformer 46 is to cause an output voltage 92 (Fig. 2*e*) to appear across secondary winding 94 as a square wave of peak-to-peak value representing the sum of charge voltages 88, 90, i.e., output voltage 92 swings about the mean level of charge voltages 88, 90, such mean level being indicated by a line 96 in Fig. 2*d*.

For the situation illustrated where signal $S_2$ is 180° out of phase with signal $S_1$, signal $S_1$ being of the same phase as above, charge voltages 86 will build up on capacitor 84 as previously described. However, the charge on capacitor 36 will be opposite to that previously described, where $S_1$ was in phase with $S_2$, indicated at 88′ and 90′ in Fig. 2*d*. Charges 86, 90′ appearing at junction 42 are therefore of the same sense, and hence their difference is smaller. Transformer 46 causes an output voltage 98 (Fig. 2*c*) to appear across secondary winding 94 which is a square wave varying about the mean level of charge voltages 88′, 90, as indicated at 100 in Fig. 2*d*.

Fig. 3 illustrates the circuit of Fig. 1 arranged in accordance with this invention to develop a cyclical output signal proportional to the sum of the first time derivatives of separate input signals. This is accomplished by capacitors 106, 108, located between emitters 18, 20 and 24, 26, along with capacitors 34, 36. The difference between the charges on capacitors 34, 106 causes D.-C. pulses to appear at junction 42 which vary in a manner proportional to the first time derivative of signal $S_1$. Similarly, the difference between the charges on capacitors 36, 108 results in D.-C. voltage variations at junction 42 representing the first time derivative of signal $S_2$. These voltage variations are combined in the same manner as described for voltage pulses of the same magnitude, and result in an output signal 110 (Fig. 4*d*) which is proportional to their sum. This arrangement is of great utility in autopilot control systems for aircraft, where it is desired to mix separate velocity signals and obtain a resultant acceleration signal. Inasmuch as this is accomplished without attenuation of the velocity signals, amplifier means heretofore required are eliminated, whereby a saving in space, weight and complexity of equipment is realized.

It should be noted that the transistors here shown and described represent one type of switching device. Other types of switching devices may be employed, e.g., diode bridges wherein a respective secondary winding is connected across opposite terminals, the remaining terminals being the input and output terminals of the switch. The type of switch used is characterized in that it has a pair of terminals which can be coupled to an A.-C. reference voltage to render it alternately conducting, and an output terminal thereof is placed at the same potential as an input terminal when it conducts.

What is claimed is:

In combination, first and second transistor devices having respective emitter, collector and base electrodes, the emitter electrodes of said first and second transistors being directly connected, third and fourth transistor devices having respective emitter, collector and base electrodes, the emitter electrodes of said third and fourth transistors being directly connected, respective capacitors connected between the junctions of the directly connected emitter electrodes and a point of reference potential, a source of reference voltage of predetermined frequency, respective means coupled between the base and collector electrodes of each transistor being coupled to said source and operative to render said transistors alternately conducting, said last named means being arranged to effect alternate conduction of said first and third transistors and said second and fourth transistors, respective input circuits connected between the collector electrodes of said first and third transistors and a point of reference potential, a common junction connected to the collector electrodes of said second and fourth transistors, and an output circuit coupled to said common junction.

References Cited in the file of this patent

UNITED STATES PATENTS

| | | |
|---|---|---|
| 2,708,718 | Weiss | May 17, 1955 |
| 2,864,961 | Lohman et al. | Dec. 16, 1958 |

FOREIGN PATENTS

| | | |
|---|---|---|
| 203,165 | Australia | Dec. 8, 1955 |
| 1,145,796 | France | May 13, 1957 |